United States Patent
Rose et al.

(10) Patent No.: US 9,574,452 B2
(45) Date of Patent: Feb. 21, 2017

(54) NOISE-REDUCED TURBOMACHINE

(75) Inventors: Marco Rose, Freiberg (DE); Lars Willer, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 972 days.

(21) Appl. No.: 13/704,073

(22) PCT Filed: Jun. 14, 2011

(86) PCT No.: PCT/EP2011/002919
§ 371 (c)(1),
(2), (4) Date: Mar. 25, 2013

(87) PCT Pub. No.: WO2011/157398
PCT Pub. Date: Dec. 22, 2011

(65) Prior Publication Data
US 2013/0195610 A1    Aug. 1, 2013

(30) Foreign Application Priority Data
Jun. 14, 2010    (DE) .................. 10 2010 023 703

(51) Int. Cl.
*F01D 9/04*    (2006.01)
*F04D 29/54*    (2006.01)
(Continued)

(52) U.S. Cl.
CPC .............. *F01D 9/041* (2013.01); *F01D 5/145* (2013.01); *F01D 5/18* (2013.01); *F01D 9/02* (2013.01);
(Continued)

(58) Field of Classification Search
CPC .......... F04D 29/542; F01D 5/145; F01D 5/18; F01D 9/02; F02C 9/18
(Continued)

(56) References Cited

U.S. PATENT DOCUMENTS 2,720,356 A    10/1955   Erwin
5,782,077 A *  7/1998   Porte ................... F02C 7/185
                                                165/154
(Continued)

FOREIGN PATENT DOCUMENTS

DE    1456067    7/1970
EP    1382855    1/2004
(Continued)

OTHER PUBLICATIONS

International Search Report dated Jan. 30, 2013 for counterpart PCT application.
(Continued)

*Primary Examiner* — Audrey K Bradley
*Assistant Examiner* — Anthony Ayala Delgado
(74) *Attorney, Agent, or Firm* — Shuttleworth & Ingersoll, PLC; Timothy J. Klima

(57) ABSTRACT

A turbomachine has an annular main flow duct through which passes a flow, and in which is arranged at least one stator provided with stator vanes. The stator vanes each have at least one recess issuing into a flow duct inside the stator vanes and the flow duct issues into a bypass duct of the turbomachine via at least one outflow duct provided with a shut-off element.

19 Claims, 6 Drawing Sheets

Figure 1:
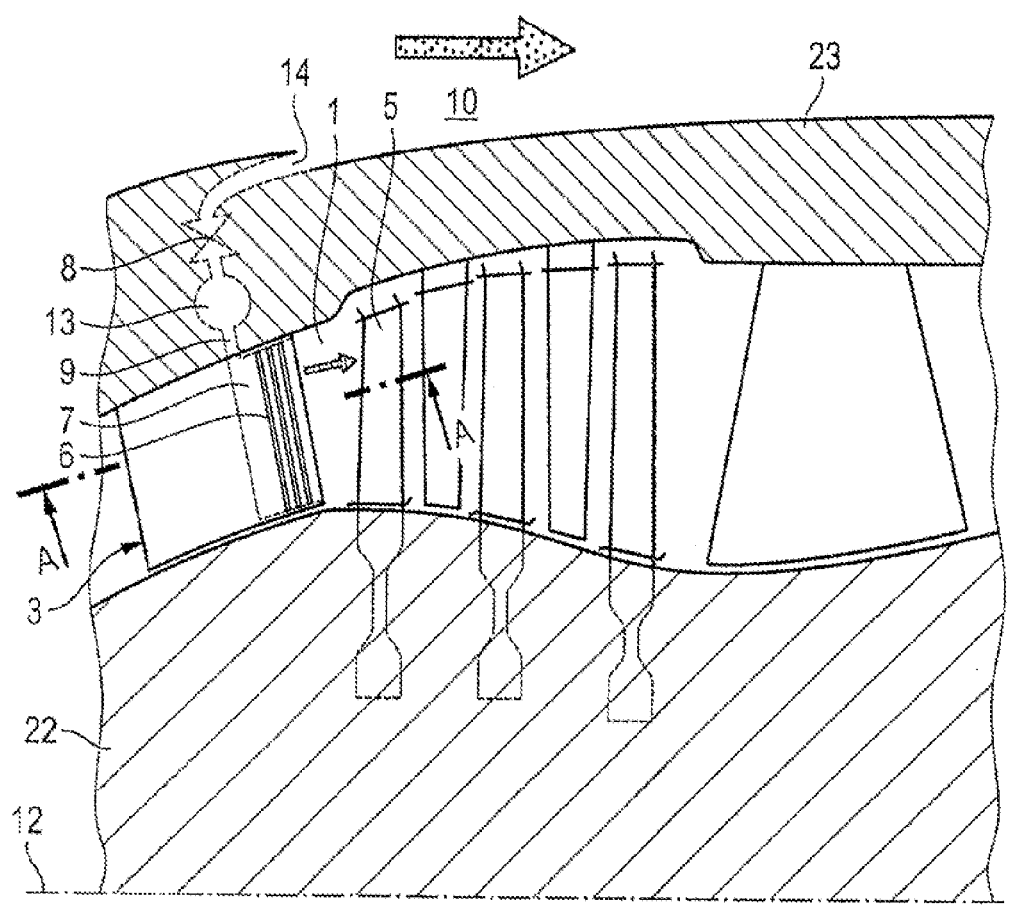

(51) Int. Cl.
  *F04D 27/02* (2006.01)
  *F01D 5/14* (2006.01)
  *F02C 9/18* (2006.01)
  *F01D 9/02* (2006.01)
  *F02C 7/045* (2006.01)
  *F01D 5/18* (2006.01)
  *F04D 29/68* (2006.01)

(52) U.S. Cl.
  CPC ............... *F02C 7/045* (2013.01); *F02C 9/18* (2013.01); *F04D 27/023* (2013.01); *F04D 29/544* (2013.01); *F04D 29/682* (2013.01); *F05D 2240/12* (2013.01); *F05D 2240/122* (2013.01); *F05D 2240/304* (2013.01); *F05D 2260/96* (2013.01); *F05D 2270/17* (2013.01); *Y02T 50/671* (2013.01); *Y02T 50/673* (2013.01); *Y02T 50/676* (2013.01)

(58) Field of Classification Search
  USPC .............................................. 415/115, 208.1
  See application file for complete search history.

(56) References Cited

U.S. PATENT DOCUMENTS

| | | | |
|---|---|---|---|
| 5,813,625 A | 9/1998 | Hassan et al. | |
| 7,077,623 B2 | 7/2006 | Guemmer | |
| 7,364,404 B2 | 4/2008 | Guemmer | |
| 7,661,261 B2 | 2/2010 | Julliard et al. | |
| 2005/0081530 A1 | 4/2005 | Bagnall et al. | |
| 2005/0238483 A1* | 10/2005 | Guemmer | F01D 5/145 415/169.1 |

FOREIGN PATENT DOCUMENTS

| | | |
|---|---|---|
| EP | 1536146 | 6/2005 |
| EP | 1950383 | 7/2008 |
| EP | 1998003 | 12/2008 |
| GB | 1085227 | 9/1967 |
| WO | 03/071113 | 8/2003 |

OTHER PUBLICATIONS

Notification of Transmittal of the Translation of the International Preliminary Report on Patentability dated May 2, 2013 for counterpart PCT application.

German Search Report dated Mar. 2, 2011 from counterpart application.

* cited by examiner

NOISE-REDUCED TURBOMACHINE

This application is the National Phase of International Application PCT/EP2011/002919 filed Jun. 14, 2011 which designated the U.S. and that International Application was published under PCT Article 21(2) in English.

This application claims priority to German Patent Application No. 102010023703.5 filed Jun. 14, 2010 and PCT Application No. PCT/EP2011/002919 filed Jun. 14, 2011, which applications are incorporated by reference herein.

This invention relates to a turbomachine with noise reduction.

In detail, the invention relates to a turbomachine with an annular main flow duct through which passes a flow, and in which are arranged at least one stator provided with stator vanes and downstream of said stator a rotor provided with rotor blades. In particular, the invention can be designed in the form of a gas-turbine engine or a stationary gas turbine.

The invention relates very generally to any stator/rotor arrangement that can be provided in an aircraft engine or a stationary gas-turbine facility or a turboshaft engine. The arrangement in accordance with the invention can here be used in various assemblies, for example in a fan, a booster, a compressor or a turbine.

The invention therefore relates very generally to turbomachines in which energy conversion takes place. The working medium may be gas, steam or liquid.

The invention is therefore not limited to gas turbines.

In stator/rotor combinations the working medium generally flows in the direction of a rotational axis (machine axis) or also in the radial direction or in a combination of radial and axial directions.

Figure 2:
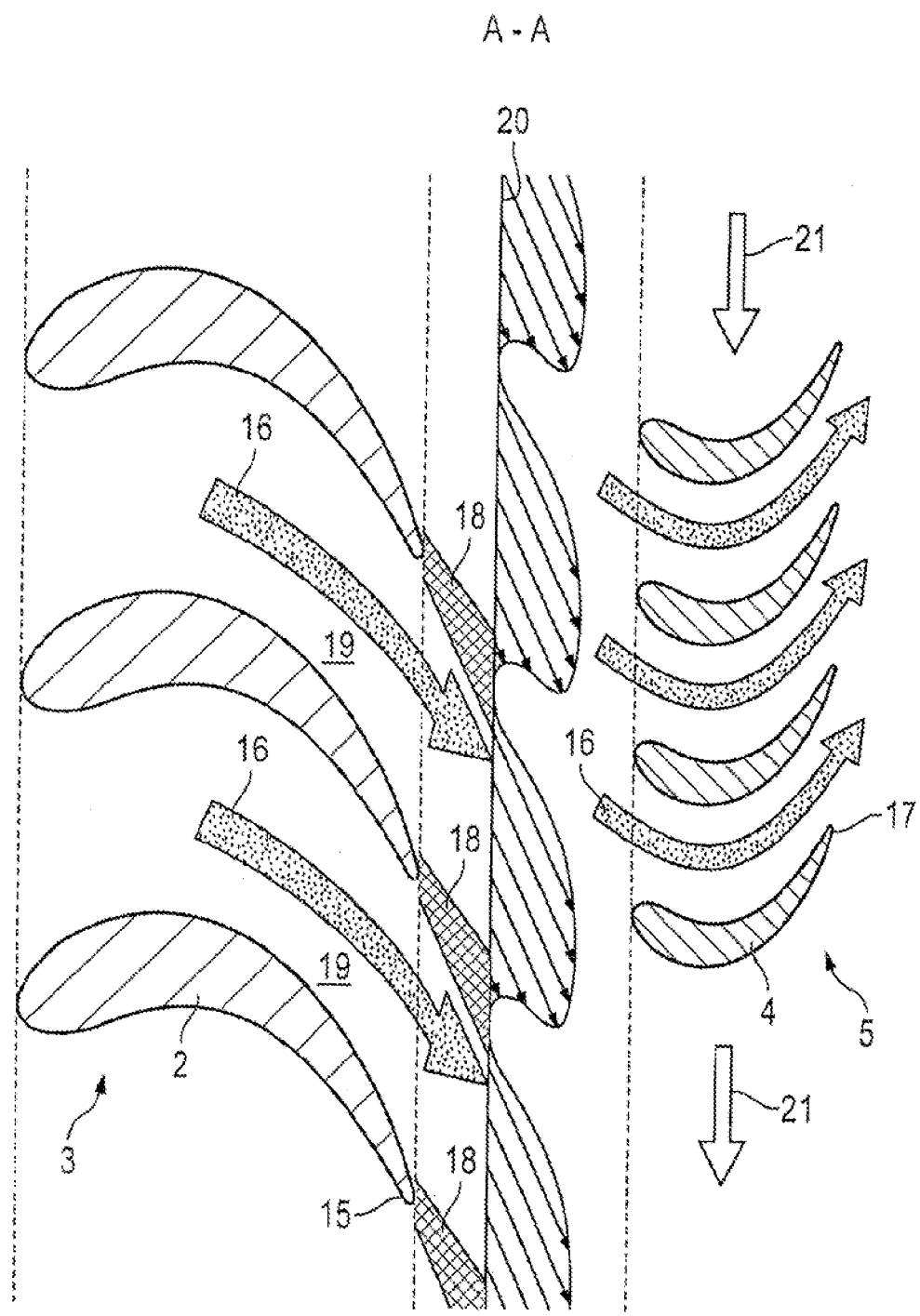

FIG. 2 shows schematically an arrangement of this type in an axial sectional plane (see also FIG. 1). Here the flow is from the left-hand to the right-hand side in accordance with FIG. 2 such that the flow initially passes through stator vanes 2 and then after flowing off a stator profile trailing edge (outflow edge) 15 of the respective stator vane 2 passes into an interspace and then flows into the area of rotor blades 4.

The blade cascade shown in FIG. 2 thus has the effect that in a stator 3 formed by the stator vanes 2 a working medium 16 is diverted in the rotational direction of a rotor 5 formed by the rotor blades 4. Inside the rotor 5, the flow expands and the working medium 16 is accelerated. According to the principle of momentum conservation from fluid mechanics, the result from the inlet momentum and the outlet momentum is the reaction momentum. The resultant force component in the circumferential direction sets the rotor 5 in rotation. Downstream of the stator profile trailing edges (outflow edges) 15 of the stator 3 or the rotor profile trailing edge (outflow edge) 17 of the rotor 5 the flow occupies local areas with a low momentum flow. These so-called wake areas are shown in FIG. 2 with the reference numeral 18. The flow of the wake has a lower flow velocity in the direction of the main flow relative to the flow inside a passage 19 between the stator vanes 2 and is characterized by vortex formation.

FIG. 2 (Prior Art) shows a varying flow velocity as a result of the wakes that periodically result in the circumferential direction 20. Due to the relative movement between the rotor 5 and the stator 3 or between the stator 3 and the rotor 5, a time-varying velocity and a time-varying momentum result at a point inside the stationary system (stator) and inside the rotary system (rotor), respectively. If the flow emanating from the stator 3 or the rotor 5 impacts the downstream rotor or stator respectively, the time-varying periodic flow at the rotor or stator generates a periodically time-varying pressure field. This interaction of the flow, in particular the impact of the wake 18 (wake flow) on the downstream blading, is an unwelcome yet very effective generating mechanism for the tonal noise in a turbomachine of this type. It is frequently the dominant noise source.

Flow conditions and noise generation mechanisms of that type also occur in an engine fan due to interaction of the wakes of the rotor with the stators of the bypass duct and inside the compressor.

Both active and passive solutions for noise reduction are known from the state Of the art.

In the case of passive solutions, acoustic sound absorbers of various design are used, for example, which reduce the energy of the propagating acoustic fields. Due to their design, however, measures of this type are not always optimum to use and also not completely satisfactory with regard to their effectiveness.

In the case of active solutions, adjustable elements at the leading edges and/or trailing edges of profiles are known. Measures of this type are technically difficult to implement. Furthermore, it is known to blow gaseous or liquid media out of the surfaces of rotors or stators, respectively. A solution of this type is shown for example in US 5 813 625 A.

The blowing-out of fluid near the leading edge or trailing edge has however proved to be inefficient The object underlying the present invention is to provide a gas turbine of the type mentioned at the beginning which while being simply designed and easily and cost-effectively producible avoids the disadvantages of the state of the art turbine and provides a high degree of noise reduction.

It is a particular object of the present invention to provide solution to the above problematics by a combination of the features described herein. Further advantageous embodiments of the invention become apparent from the description below.

It is therefore provided in accordance with the invention that the stator vanes each have at least one recess issuing into a flow duct inside the stator vane and that the flow duct issues into a bypass duct of the gas turbine via at least one outflow duct provided with a shut-off element.

Hence fluid in the area of the stator vane is, in accordance with the invention, drawn off by the at least one recess and discharged out of the annular main flow duct. By this active measure, it is possible to achieve a considerable noise reduction, depending on the operating point of the turbomachine (gas turbine).

In accordance with the invention, the recesses are, in a favorable embodiment, designed slot-like or as a line-type row of holes or recesses and preferably located on the suction side of the stator vane. In a particularly favourable development of the invention, it is provided that the recesses extend over substantially the entire radial length of the stator vane. It is however also possible in accordance with the invention to vary the outflow surface formed by the recesses in the radial direction such that different outflow surfaces are obtained on the radially inner or radially outer area of the stator vane.

It can furthermore be favourable in accordance with the invention to provide several recesses, slots or rows of holes arranged successively in the flow direction and hence adjacent to one another. It is thus possible to draw off fluid on a variable area adjacent to the stator profile trailing edge (outflow edge) 15 of the stator vane.

The drawing-off of the fluid is effected through the flow duct inside the stator vane, which represents a plenum, in which a decrease in pressure stresses or pressure gradients can take place due to a relatively large internal volume.

Via the outflow duct, the fluid is drawn off into a bypass duct. Due to the lower pressure prevailing in the bypass duct, a suction effect results.

The at least one shut-off element can be opened or closed by means of a suitable control or regulation unit depending on the operating states. It is for example possible to considerably reduce the noise of an aircraft gas turbine during landing approach. The invention can therefore be actively used at different operating conditions.

The present invention provides a number of considerable advantages: there is an efficient reduction of the tonal rotor noise (stator/rotor interaction noise). Furthermore there are only very small or no flow losses. The solution in accordance with the invention is robust, requires low maintenance effort, is distinguished by a low additional weight, and dispenses with moving parts, except for the shut-off element. The result is considerable advantages with regard to production costs. Another advantage is that no additional energy is needed except for actuating the shut-off element. Due to the activation option of the invention depending on the respective operating condition of the machine, the result is very advantageous and variable use.

It is clear that the invention can also be used in a rotor from whose blades fluid is drawn off and discharged by a rotating hub into a bypass duct or to the environment.

Figure 3:
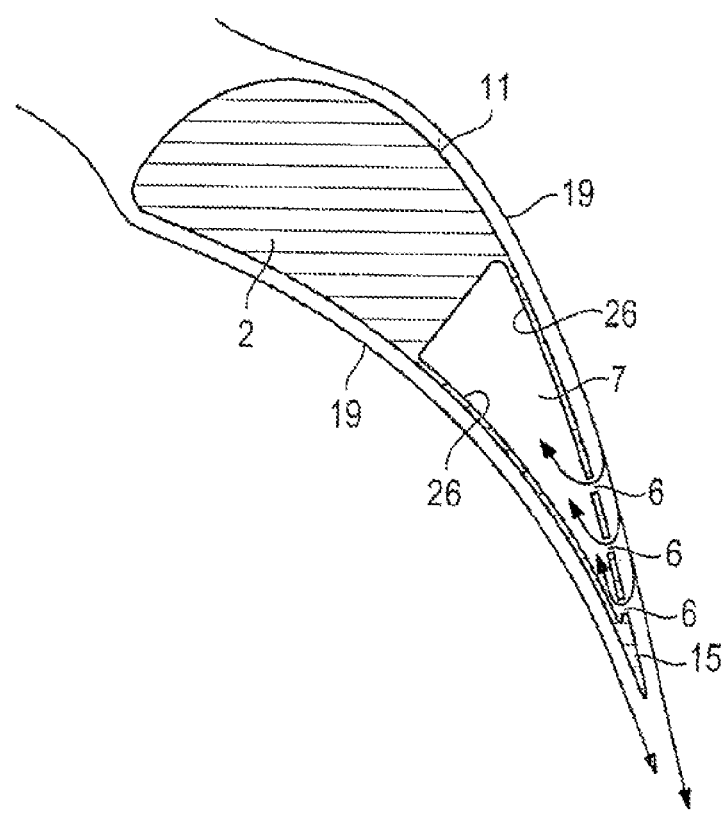
Figure 4:
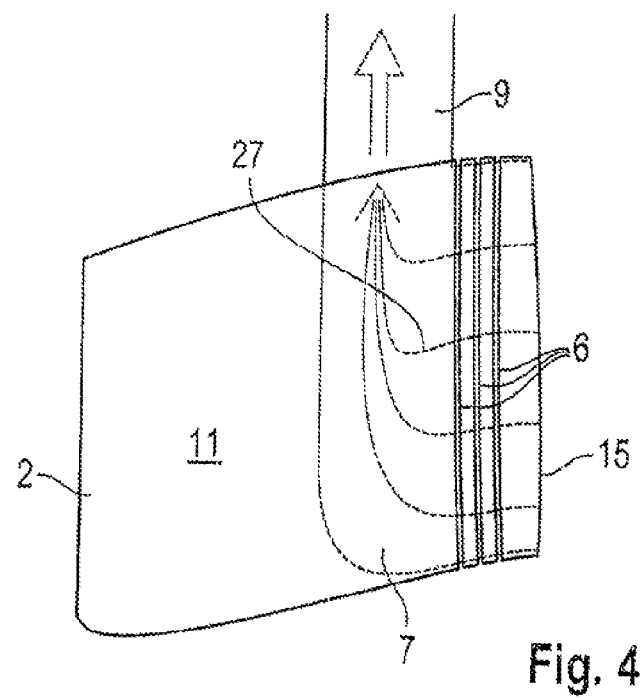
Figure 5:
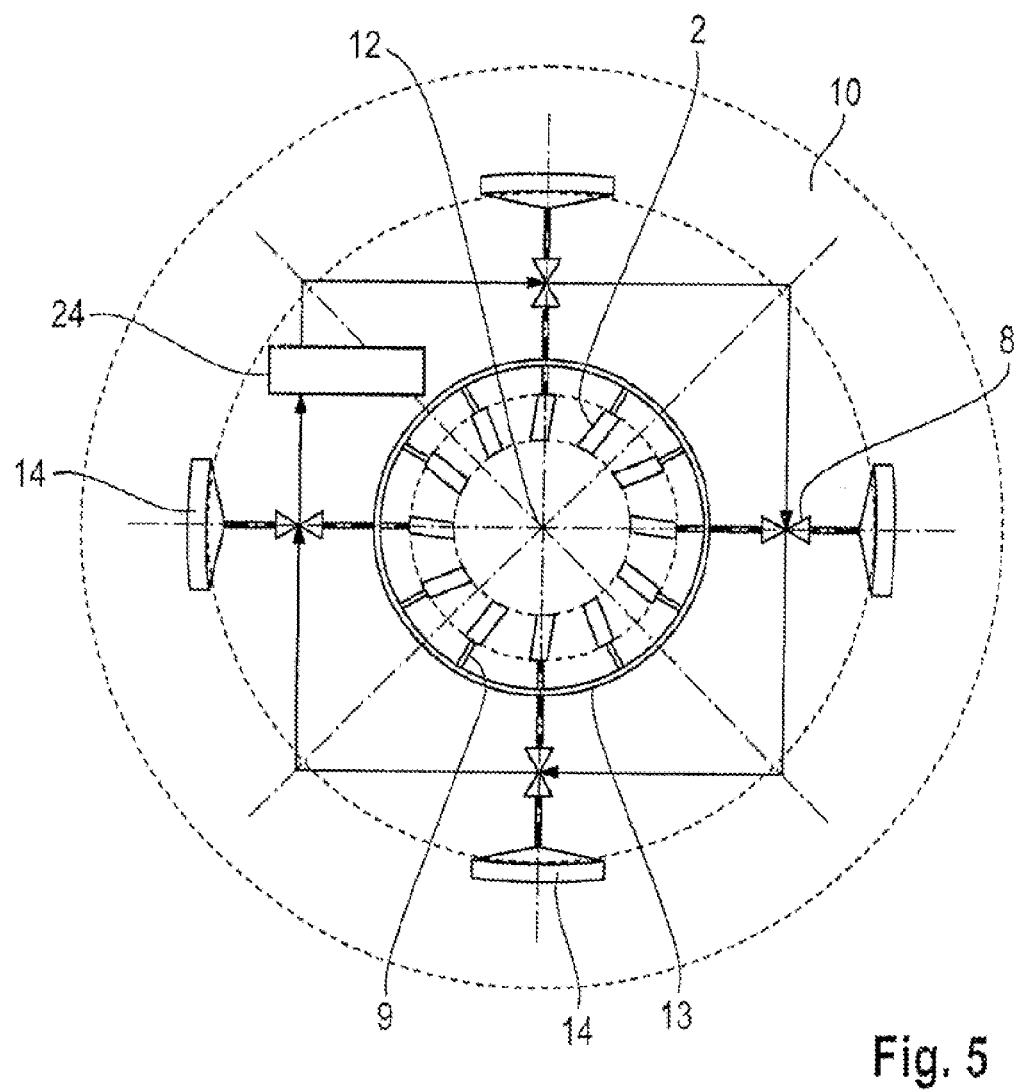

The present invention is described in the following in light of the accompanying drawing showing an exemplary embodiment. In the drawing, FIG. 1 shows a partial axial sectional view in schematic representation, FIG. 2 shows a sectional view along line A-A of FIG. 1 in development of a plane, FIG. 3 shows an enlarged sectional view through a stator vane in accordance with the invention, represented by analogy with FIG. 2, FIG. 4 shows a side view of a stator vane in accordance with the invention, represented by analogy with FIG. 1, FIG. 5 shows a simplified sectional view in a plane arranged vertically to a machine axis, FIG. 6 shows a representation of the flow conditions in accordance with the invention in sectional view A-A by analogy with FIG. 2, and FIG. 7 shows a side view by analogy with FIG. 4 with representation of guide surfaces.

FIG. 1 shows a machine axis 12 relative to which an annular main flow duct 1 extends symmetrically and concentrically and is delimited by a hub arrangement 22 and a casing arrangement 23. A bypass duct 10 is provided outside the casing arrangement 23.

At least one stator 3 having individual stator vanes 2 is arranged inside the annular main flow duct 1 (FIG. 2).

Figure 6:
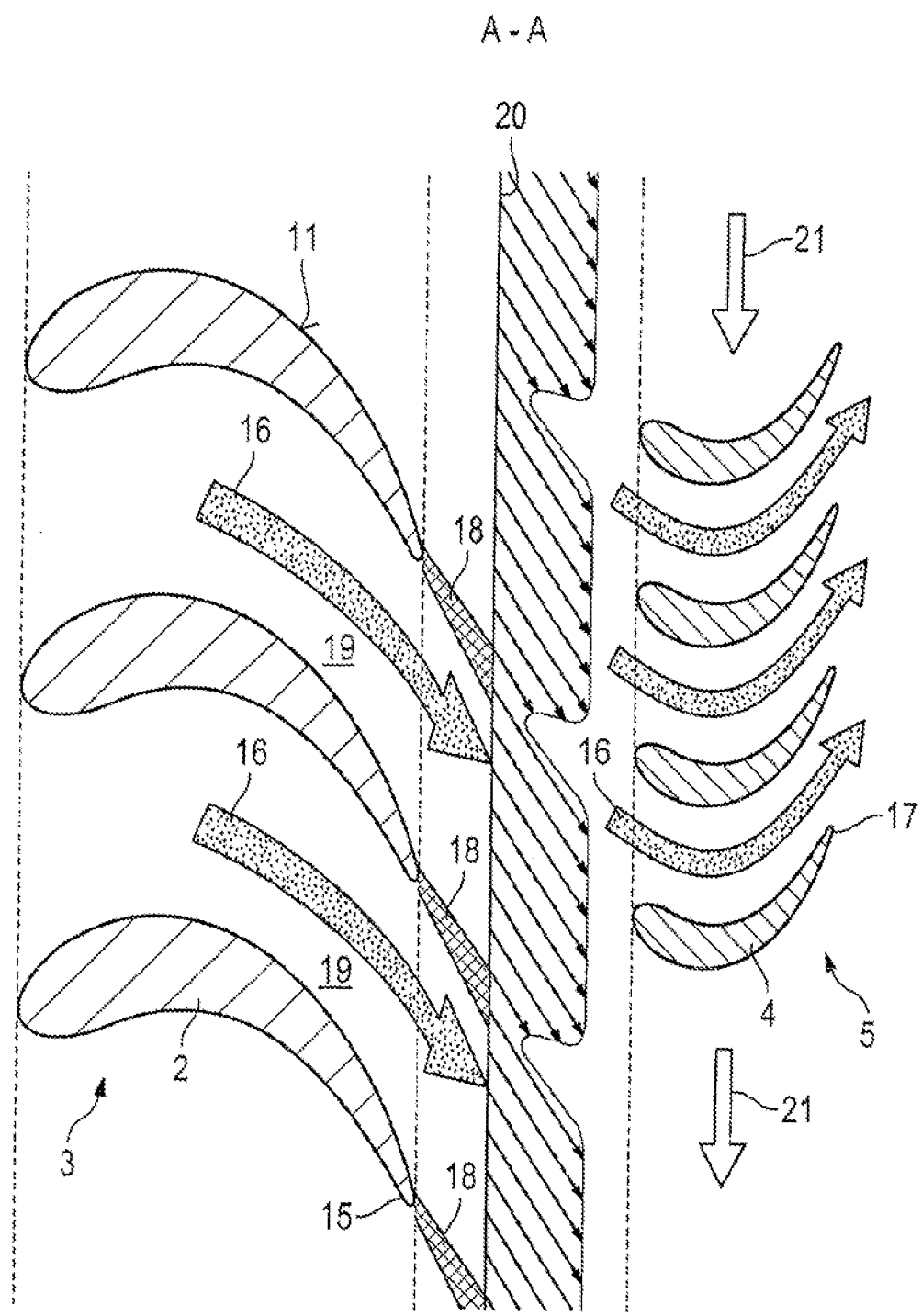
Figure 7:
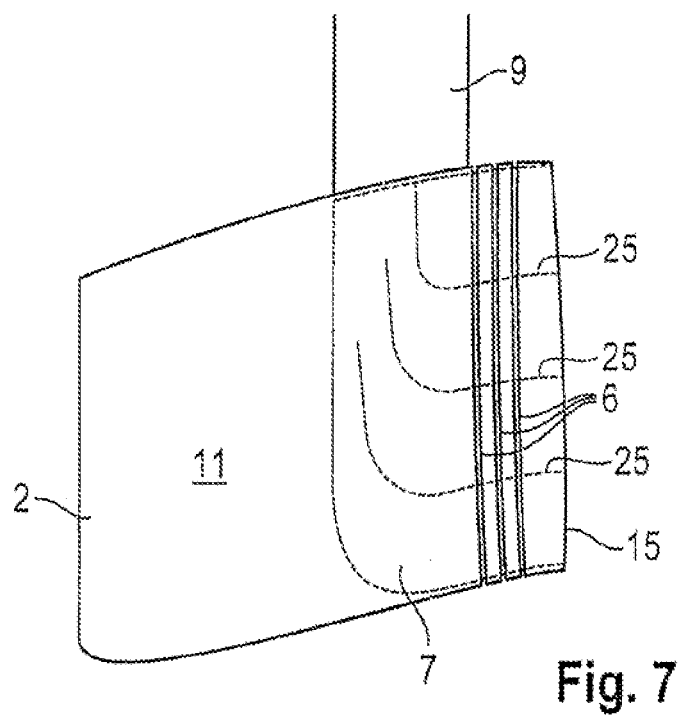

A rotor 5 having rotor blades 4 is provided downstream of the stator 3, and rotates about the machine axis 12 as shown by the rotational direction 21 in FIGS. 2 and 6.

FIGS. 1, 3 and 4 show in a schematic representation several slot-like recesses 6 arranged substantially parallel to one another and adjacent to the profile trailing edge (outflow edge) 15 of the stator, through which recesses part of the flow at a suction side 11 of the stator vane 2 (see FIG. 3) is passed into a flow duct 7 provided in the interior of the stator vane 2 and forming a plenum. The flow duct 7 extends substantially over the entire radial length of the stator vane 2 and issues into an outflow duct 9 provided in the casing arrangement 23. The respective outflow duct 9 assigned to each individual stator vane 2 issues into an annular duct 13 as shown in FIG. 5 too. The annular duct 13 thus leads to pressure equalization in the circumferential direction.

The flow introduced into the annular duct 13 is supplied via at least one shut-off element 8 to a diffuser 14 issuing into the bypass duct 10. The individual shut-off elements 8 (valves) can be actuated depending on the operating conditions by means of a control unit.

As shown in the figures, the slot-like recesses 6 in the embodiment shown are transverse to the flow direction, and they can be arranged at equal or varying spacings. It is also possible to provide rows of bores or holes and to vary them in the radial direction. This allows suitable fluid flows to be drawn off from the suction side 11.

The arrangement of the recesses 6 adjacent to the profile trailing edge (outflow edge) 15 of the stator is advantageous because that is where the thickness of the low-momentum boundary layer forming the wake (wake area 18) further downstream is greatest.

The invention shows in FIG. 7 a preferred development of the invention in which guide surfaces 25 are provided on the inner sides 26 of the plenum (flow duct) 7. These surfaces are used to guide the flow inside the flow duct 7 as shown by the dashed lines in FIG. 4 (fluid flow 27). The flow profile inside the plenum (flow duct) 7 is optimized by the guide surfaces 25 in accordance with the invention and shown in FIG. 7.

Thus an extraction of fluid from the main flow of the working medium 16 takes place in accordance with the invention in the passage 19 between the stator vanes 2. As shown in FIGS. 1 and 6, the pressure in the passage 19 between the stator vanes 2 is greater than the pressure in the bypass duct 10 or the pressure in an ambient atmosphere. When the shut-off elements 8 are opened, a flow is driven by the pressure difference between the flow in the passages 19 and the bypass duct 10 or the ambient atmosphere, respectively. In so doing, fluid is extracted from the passage 19 through the recesses 6, conveyed through the plenum (flow duct) 7 and supplied to the annular duct 13. From there the fluid passes through the shut-off elements 8 and the diffusers 14 into the bypass duct 10 or into the ambient atmosphere, respectively.

As shown in FIG. 6, this results in an effect on the flow in the passage 19. By extracting the fluid from the flow close to the wall (flow boundary layer), the wake 18 (wake flow) beginning at the profile trailing edges (outflow edges) 15 of the stator weakens in intensity and its extent in the circumferential direction becomes narrower. The velocity profile in the circumferential direction 20 is equalized and varies less widely. In contrast with the illustration in FIG. 2 (state of the art), the result in FIG. 6 is that the spatial variance of the flow profile in the circumferential direction reduces, and in the case of a relative movement between the stator 3 and the rotor 5 the time variance and amplitude of the pressure field connected to them, which forms the mechanism for sound generation in the stator/rotor interaction, also reduces. The generated noise is hence much less. The tonal interaction noise can thus be reduced as part of a noise reduction potential of about 5 to 6 dB.

LIST OF REFERENCE NUMERALS

1 Annular main flow duct
2 Stator vane
3 Stator
4 Rotor blade
5 Rotor
6 Recess

7 Flow duct / plenum
8 Shut-off element
9 Outflow duct
10 Bypass duct
11 Suction side
12 Machine axis
13 Annular duct
14 Diffuser
15 Profile trailing edge (outflow edge) of stator
16 Working medium
17 Profile trailing edge (outflow edge) of rotor
18 Wake area / wake I wake flow
19 Passage
20 Circumferential direction
21 Rotational direction of rotor
22 Hub arrangement
23 Casing arrangement
24 Control unit
25 Guide surface
26 Inner side
27 Fluid flow

What is claimed is:

1. A turbomachine, comprising:
   an annular main flow duct through which passes a flow;
   a bypass duct positioned outside the main flow duct;
   a stator having a plurality of stator vanes arranged in the main flow duct, the stator vanes each having a recess opening to the main flow duct;
   a flow duct inside each stator vane, the recess issuing into the flow duct;
   an outflow duct, connected to the bypass duct, the flow duct issuing into the bypass duct via the outflow duct;
   a shut-off valve for shutting-off flow through the outflow duct;
   wherein a pressure of the bypass duct at the connection to the outflow duct is less than a pressure of the main flow duct at the recess, creating a relative suction at the recess via the flow duct connecting to the outflow duct connecting to the bypass duct, thereby providing a flow through the recess from the main flow duct and issuing the suction flow into the bypass duct.

2. The turbomachine of claim 1, wherein the stator is a guide vane.

3. The turbomachine of claim 2, wherein the recess is a slot.

4. The turbomachine of claim 2, wherein the recess is formed as a linear row of holes.

5. The turbomachine of claim 2, wherein the recess is located on a suction side of the stator vane.

6. The turbomachine of claim 5, wherein the recess is arranged adjacent to a stator profile trailing edge of the stator vane.

7. The turbomachine of claim 6, wherein the recess extends substantially over an entire radial length of the stator vane.

8. The turbomachine of claim 7, and further comprising a plurality of recesses arranged at at least one chosen from equal and varying spacing to one another.

9. The turbomachine of claim 8, wherein the at least one outflow duct is connected to an annular duct extending in the circumferential direction relative to a machine axis, and the flow ducts issue into the annular duct.

10. The turbomachine of claim 9, and further comprising a diffuser, the outflow duct issuing into the bypass duct via the diffuser.

11. The turbomachine of claim 10, wherein the recess is dimensioned such that at least one chosen from an intensity and a circumferential extension of a wake flow flowing off at the profile trailing edge of the stator vane is reduced.

12. The turbomachine of claim 11, and further comprising a control unit for opening the shut-off valve in noise-relevant operating states.

13. The turbomachine of claim 1, wherein the recess is formed as a linear row of holes.

14. The turbomachine of claim 1, wherein the recess is located on a suction side of the stator vane.

15. The turbomachine of claim 1, wherein the recess is arranged adjacent to a stator profile trailing edge of the stator vane.

16. The turbomachine of claim 15, wherein the recess extends substantially over an entire radial length of the stator vane.

17. The turbomachine of claim 16, and further comprising a plurality of recesses arranged at at least one chosen from equal and varying spacing to one another.

18. A method for reducing noise of a turbomachine, comprising:
   providing a turbomachine, comprising:
      an annular main flow duct through which passes a flow;
      a bypass duct positioned outside the main flow duct;
      a stator having a plurality of stator vanes arranged in the main flow duct, the stator vanes each having a recess opening to the main flow duct;
      a flow duct inside each stator vane, the recess issuing into the flow duct;
      an outflow duct connected to the bypass duct, the flow duct issuing into the bypass duct via the outflow duct;
      a shut-off valve for shutting-off flow through the outflow duct;
   providing that a pressure of the bypass duct at the connection to the outflow duct is less than a pressure of the main flow duct at the recess, such that a relative suction is created at the recess via the flow duct connecting to the outflow duct connecting to the bypass duct;
   drawing off a fluid flow via the recess of the stator vane using the relative suction at the recess to reduce an intensity of a wake flow flowing off at a profile trailing edge of the stator vane;
   passing the fluid flow into a bypass duct of the turbomachine.

19. The method of claim 18, and further comprising passing the fluid flow from the recess through at least one chosen from the flow duct and an annular duct fluidically connected to the flow duct.

* * * * *